US010066363B1

(12) United States Patent
McGee, Jr. et al.

(10) Patent No.: US 10,066,363 B1
(45) Date of Patent: Sep. 4, 2018

(54) WEAR PAD SYSTEM (71) Applicant: CNH Industrial America LLC, New Holland, PA (US)

(72) Inventors: Lonnie Lee McGee, Jr., Burlington, IA (US); Vikram Nair, Muscatine, IA (US); Richard Lee Niespodzany, Mediapolis, IA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 15/649,320

(22) Filed: Jul. 13, 2017

(51) Int. Cl.
*E02F 9/00* (2006.01)

(52) U.S. Cl.
CPC .................................. *E02F 9/006* (2013.01)

(58) Field of Classification Search
CPC . E02F 3/286; E02F 3/304; E02F 3/305; E02F 3/4136
See application file for complete search history.

(56) References Cited

U.S. PATENT DOCUMENTS

| 3,390,794 A * | 7/1968 | McMullen | E02F 3/306 |
| | | | 414/694 |
| 4,045,936 A * | 9/1977 | Sterner | B66C 23/705 |
| | | | 414/718 |
| 4,134,236 A | 1/1979 | Ott | |
| 4,264,265 A | 4/1981 | Stoychoff | |
| 6,164,468 A | 12/2000 | Erdmann | |
| 6,607,347 B2 * | 8/2003 | Burgo | E02F 9/085 |
| | | | 414/694 |
| 7,950,171 B2 * | 5/2011 | Wurster | E02F 3/304 |
| | | | 414/728 |
| 8,434,247 B2 * | 5/2013 | Wurster | E02F 3/304 |
| | | | 414/690 |
| 2001/0010796 A1 * | 8/2001 | Burgo | E02F 9/085 |
| | | | 414/694 |
| 2004/0165796 A1 * | 8/2004 | Longhurst | F16C 23/02 |
| | | | 384/40 |
| 2006/0226107 A1 | 10/2006 | Brinkmann et al. | |
| 2009/0067972 A1 * | 3/2009 | Wurster | E02F 3/304 |
| | | | 414/722 |

FOREIGN PATENT DOCUMENTS

DE 79125 A 12/1971
EP 337518 A1 * 10/1989
(Continued)

*Primary Examiner* — Gerald McClain
(74) *Attorney, Agent, or Firm* — Peter K. Zacharias; Patrick M. Sheldrake (57) ABSTRACT

A wear pad system includes a wear pad having a contact surface that contacts a corresponding contact surface of a first object. The wear pad system further includes an adjustment cap having a threaded outer surface and a boss member, having a threaded inner surface, such that the boss member is positioned on a second object and configured to guide the wear pad along a path toward the corresponding contact surface of the first object. Furthermore, the second object moves relative to the first object, the threaded outer surface of the adjustment cap engages the threaded inner surface of the boss member, and the adjustment cap is urges the contact surface of the wear pad into contact with the corresponding contact surface of the first object in response to rotation of the adjustment cap relative to the boss member.

19 Claims, 7 Drawing Sheets

(56) References Cited

FOREIGN PATENT DOCUMENTS

| | | | | |
|---|---|---|---|---|
| EP | 867566 | A2 * | 9/1998 | |
| EP | 1243706 | A1 * | 9/2002 | .............. E02F 9/085 |
| GB | 2125004 | B | 2/1984 | |
| GB | 2392663 | A * | 3/2004 | .............. E02F 3/306 |
| JP | 08311913 | A * | 11/1996 | |
| JP | 08333766 | A * | 12/1996 | |

* cited by examiner

WEAR PAD SYSTEM

BACKGROUND

The present disclosure relates generally to a wear pad system.

Certain work vehicles (e.g., tractors, harvesters, skid steers, etc.) may support tools configured to plow a field, deposit seeds, excavate soil, or accomplish other suitable operations. For example, a work vehicle may support a backhoe to excavate soil. The backhoe includes wear pads between moving parts, such that the wear pads may wear over time. As a result, excess play or noise may result due to the wearing of the wear pads, causing frequent, time consuming, and expensive replacement and/or servicing of the wear pads.

BRIEF DESCRIPTION

In one embodiment, a wear pad system includes a wear pad having a contact surface that contacts a corresponding contact surface of a first object. The wear pad system further includes an adjustment cap having a threaded outer surface and a boss member, having a threaded inner surface, such that the boss member is positioned on a second object and configured to guide the wear pad along a path toward the corresponding contact surface of the first object. Furthermore, the second object moves relative to the first object, the threaded outer surface of the adjustment cap engages the threaded inner surface of the boss member, and the adjustment cap is urges the contact surface of the wear pad into contact with the corresponding contact surface of the first object in response to rotation of the adjustment cap relative to the boss member.

In another embodiment, a wear pad system for a backhoe tool includes a wear pad having a contact surface that contacts a corresponding contact surface of an inner dipper, an adjustment cap having a threaded outer surface, and a boss member positioned on an outer dipper to guide the wear pad along a path toward the corresponding contact surface of the inner dipper, such that the boss member has a threaded inner surface. Furthermore, the outer dipper moves relative to the inner dipper, the threaded outer surface of the adjustment cap engages the threaded inner surface of the boss member, and the adjustment cap urges the contact surface of the wear pad into contact with the corresponding contact surface of the inner dipper in response to rotation of the adjustment cap relative to the boss member.

In a further embodiment, a wear pad system for a backhoe tool includes a first wear pad having a first contact surface that contacts a first lateral side of an inner dipper, a second wear pad having a second contact surface that contacts a vertical side of the inner dipper, a first adjustment cap corresponding to the first wear pad, and a second adjustment cap corresponding to the second wear pad, such that the first and second adjustment caps each have a respective threaded outer surface. The wear pad system further includes a first boss member corresponding to the first wear pad, such that the first boss member is positioned on the first lateral side of an outer dipper to guide the first wear pad along a first path toward the first lateral side of the inner dipper, and a second boss member corresponding to the second wear pad, such that the second boss member is positioned on a vertical side of an outer dipper to guide the second wear pad along a second path toward the vertical side of the inner dipper. The first boss member and the second boss member each have a threaded inner surface, the outer dipper moves relative to the inner dipper, the respective threaded outer surfaces of the first and second adjustment caps engage with the threaded inner surfaces of the corresponding boss members, the first adjustment cap urges the contact surface of the first wear pad into contact with the first lateral side of the inner dipper in response to rotation of the first adjustment cap relative to the first boss member, and the second adjustment cap urges the contact surface of the second wear pad into contact with the vertical side of the inner dipper in response to rotation of the second adjustment cap relative to the second boss member.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
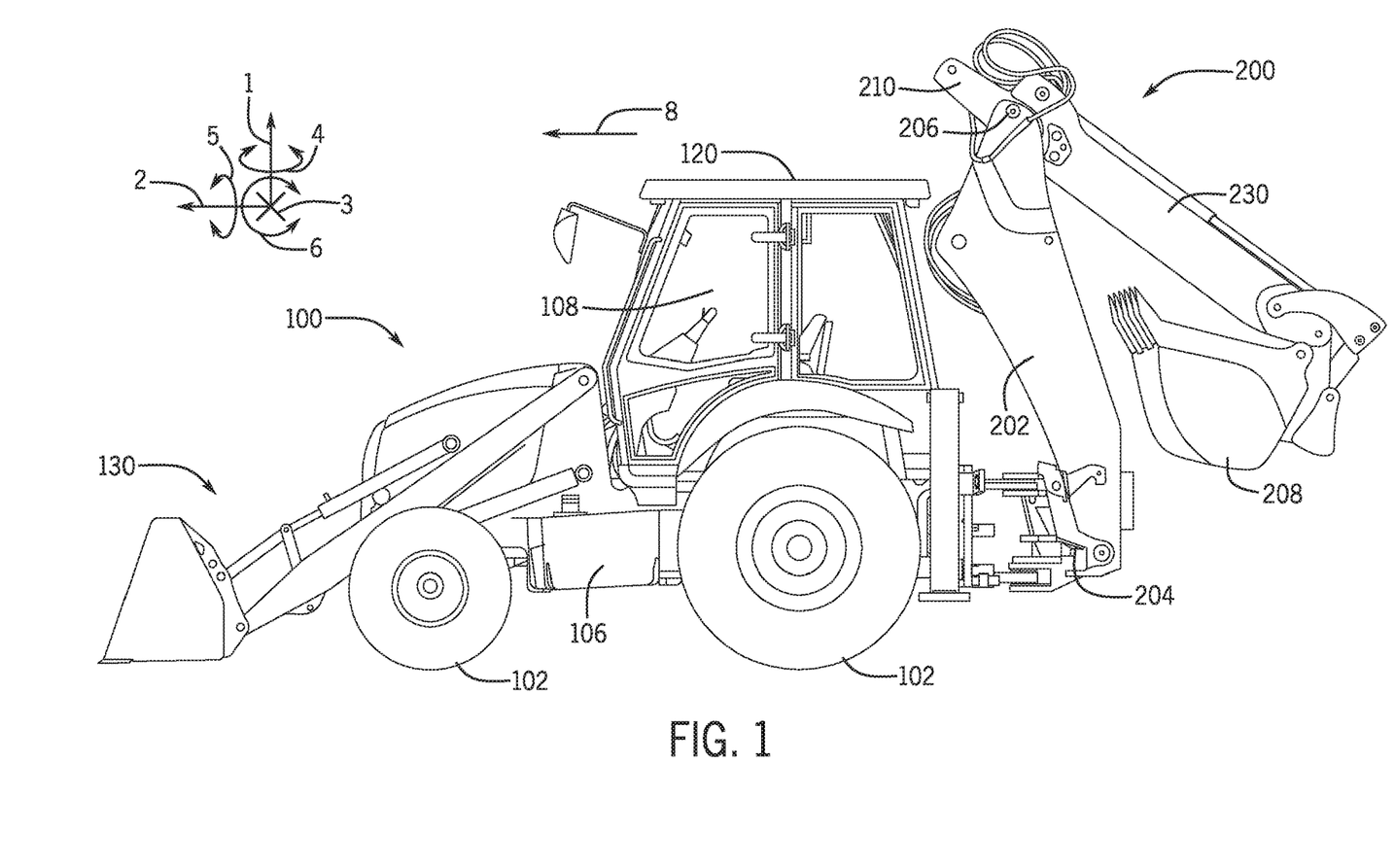
FIG. 1 is a side view of an embodiment of a work vehicle having a backhoe tool that may include one or more wear pad systems.

Turning to the drawings, FIG. 1 is a side view of an embodiment of a work vehicle 100 having a backhoe tool 200 that may include one or more wear pad systems. In the illustrated embodiment, the work vehicle 100 is a tractor. However, it should be appreciated that the backhoe tool 200 and/or the one or more wear pad systems disclosed herein may be utilized on other work vehicles, such as but not limited to on-road trucks, tractors, harvesters, and construction equipment. Furthermore, in alternative embodiments, the one or more wear pad systems may be used in any tools, such as boom and dipper assemblies, masts, forklift extensions, and the like. In the illustrated embodiment, the work vehicle 100 includes a cab 120 and a chassis 106. In certain embodiments, the chassis 106 is configured to support a motor (e.g., diesel engine, etc.), a hydraulic system (e.g., including a pump, valves, reservoir, etc.), and other components (e.g., an electrical system, a cooling system, etc.) that may facilitate operation of the work vehicle. In addition, the chassis 106 is configured to support the cab 120 and wheels 102. The wheels 102 may rotate to advance and direct the movement of the work vehicle 100 along a direction of travel 8. The wheels 102 may be driven to rotate by the motor and/or by component(s) of the hydraulic system (e.g., hydraulic motor(s), etc.). While the illustrated work vehicle 100 includes wheels 102, in alternative embodiments, the work vehicle may include tracks or a combination of wheels and tracks.

The cab 120 is configured to house an operator of the work vehicle 100. Accordingly, various controls, are positioned within the cab 120 to facilitate operator control of the work vehicle 100. For example, the controls may enable the operator to control rotational speed of the wheels 102, thereby facilitating adjustment of the speed and/or the direction of the work vehicle 100. In the illustrated embodiment, the cab 120 also includes a door 108 to facilitate ingress and egress of the operator from the cab 120. Furthermore, the illustrated work vehicle includes a front attachment 130, which may also be controlled (e.g., raised, lowered, etc.) by the controls of the work vehicle 100. While the illustrated work vehicle 100 includes a loader as the front attachment 130, in alternative embodiments, the work vehicle 100 may include an excavator assembly, a tilling assembly, or a gripper assembly, among other tools.

In the illustrated embodiment, the backhoe tool 200 includes a boom 202, which pivotally couples to the rear end of the work vehicle chassis 106 via a pivot joint 204. Furthermore, the backhoe tool 200 includes an inner dipper 210 coupled to the boom 202 via a pivot joint 206 at a first end of the inner dipper 210. An outer dipper 230 is configured to slide along the inner dipper 210. A bucket is coupled to the outer dipper 230 and may excavate soil, carry loads, and the like. In addition, the controls may facilitate operator control of the backhoe tool 200. For example, the controls may enable the operator to control the position of the bucket 208 by moving the outer dipper 230 away from the pivot joint 206, along the inner dipper 210.

The boom 202 and inner dipper 210 of the backhoe tool 200 may independently rotate relative to the chassis 106 about a lateral axis 3 in pitch 6 via the respective pivot joints 204 and 206. Furthermore, rotation of the backhoe tool 200 relative to the chassis 106 about the longitudinal axis 2 in roll 5 may be substantially blocked. In some embodiments, the backhoe tool 200 may rotate relative to the chassis 106 about the vertical axis 1 in yaw 4. The backhoe tool 200 may be controlled by the operator of the work vehicle 100. Rotation of the boom 202, rotation of the inner dipper 210, and translation of the outer dipper 230 relative to the inner dipper 210 may each be controlled independently of one another.

The disclosed subject matter includes a wear pad system that may facilitate servicing the wear pads associated with a backhoe tool by facilitating access to the wear pad and/or allowing for adjustment of the wear pad. As discussed in detail below, the wear pad includes a contact surface configured to contact a corresponding surface of the inner dipper 210. Furthermore, an adjustment cap includes a threaded outer surface configured to engage with a threaded inner surface of a boss member to adjust the position of the wear pad along a direction substantially perpendicular to the surface of the inner dipper 210. By turning the adjustment cap, the wear pad may be adjusted to urge the wear pad to contact the surface of the inner dipper 210. Alternatively, the adjustment cap may be rotated the opposite direction to remove the adjustment cap from the boss and expose the wear pad, thereby facilitating the replacement of the wear pad. As such, servicing the wear pad system may be facilitated by the embodiments disclosed herein.

Figure 2:
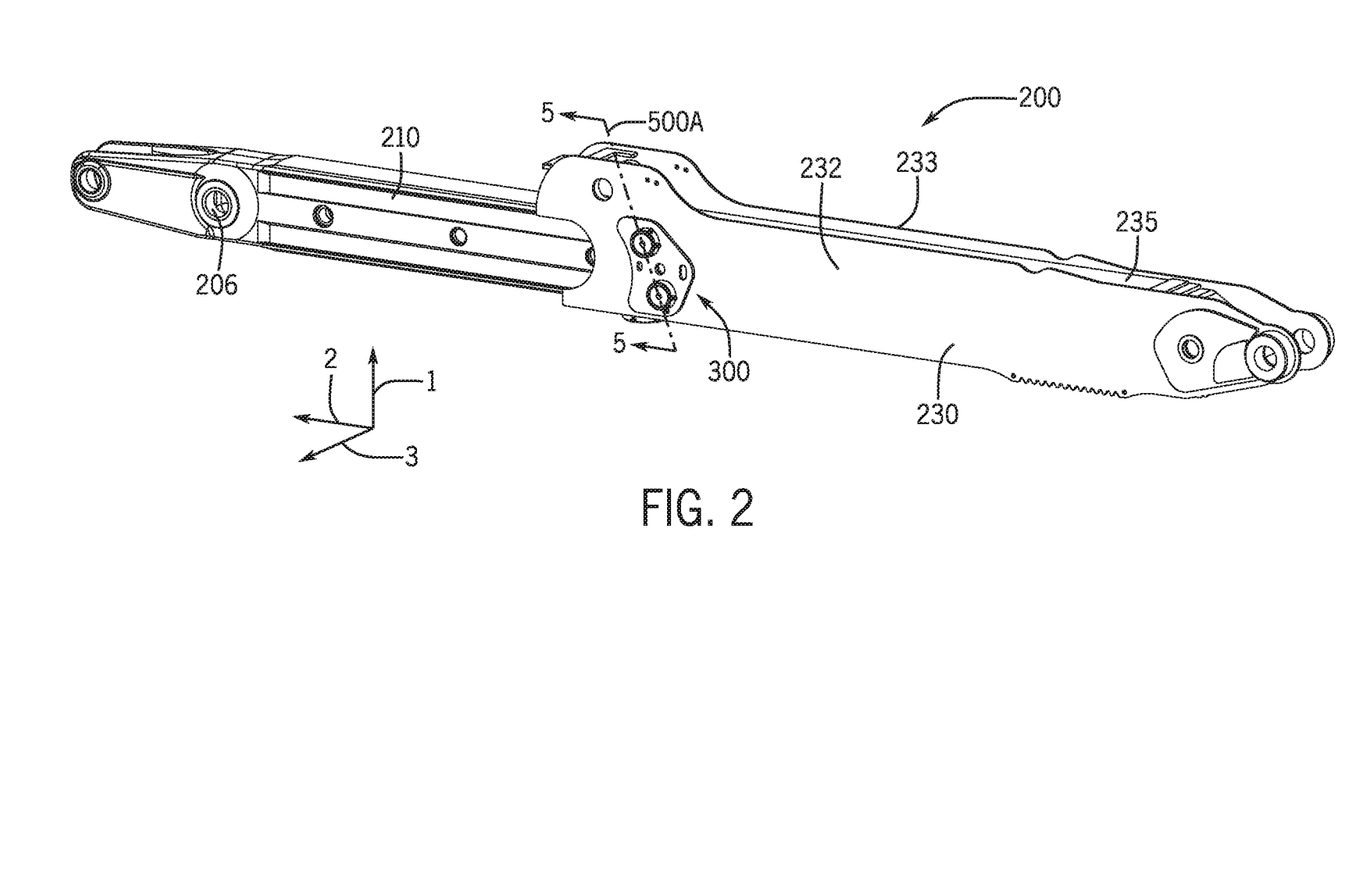
FIG. 2 is a side perspective view of an embodiment of an inner dipper and outer dipper that may be used within the backhoe tool of FIG. 1, including a side wear pad system.

Turning to FIG. 2, depicted is a side perspective view of an embodiment of the inner dipper 210 and the outer dipper that may be used within the backhoe tool 200 of FIG. 1, including a side wear pad system 300. To facilitate discussion, the illustrated inner dipper 210 and outer dipper 230 are oriented substantially parallel to the ground, such that the outer dipper 230 may translate along the longitudinal direction to relative to the inner dipper 210. As such, the outer surface of the inner dipper 210 may have dimensions configured to facilitate the translation of the outer dipper 230 is along the inner dipper 210 (e.g., along the longitudinal direction 2). For example, the extent of the inner dipper 210 along the vertical axis 1 and the extent of the inner dipper 210 along the lateral axis 3 may be less than the corresponding dimensions of the cavity within the outer dipper 230. In some embodiments of the backhoe tool 200, there may be a gap between the inner dipper 210 and the outer dipper 230 to facilitate the translation of the outer dipper 230 along the inner dipper 210.

In the illustrated embodiment, the backhoe tool 200 includes a side wear pad system 300. In some embodiments, the side wear pad system 300 may be adjusted to control the gap (e.g., clearance) between the inner dipper 210 and the outer dipper 230 to, for example, reduce movement along the lateral direction 3 and/or to reduce noise that may result from the movement, while the outer dipper 230 translates along the longitudinal direction 2. The side wear pad system 300 is coupled to the first lateral side 232 of the outer dipper 230 and oriented to face the lateral direction 3. The outer dipper 230 also includes a second lateral side 233 and a top side 235 associated with the outer dipper 230. It should be noted that the first lateral side 232 and the second lateral side 233 are positioned on laterally opposite sides of the outer dipper 230. Furthermore, the side wear pad system 300 may be coupled to the outer dipper 230 via any suitable method. For example, in some illustrated embodiment, the side wear pad system 300 may be welded to the first lateral side 232 of the outer dipper 230. In other embodiments, the side wear pad system 300 may be bolted to the first lateral side 232 via openings on the first lateral side 232.

Although the current embodiment of the backhoe tool 200 includes only one side wear pad system 300, in other embodiments, the backhoe tool 200 may include any suitable number of side wear pad systems 300 coupled to the first lateral side 232 of the outer dipper 230. For example, the backhoe tool 200 may include 2, 4, 6, 10, or any number of suitable side wear pad systems 300. In other embodiments, the outer dipper 230 may include any suitable number of side wear adjusting systems 300 coupled to the first lateral side 232 and/or on the second lateral side 233. For example, the backhoe tool may include a first side wear pad system coupled to the first lateral side 232 of the outer dipper 230 and a second side wear pad system coupled on the second lateral side 233 of the outer dipper 230.

Figure 3:
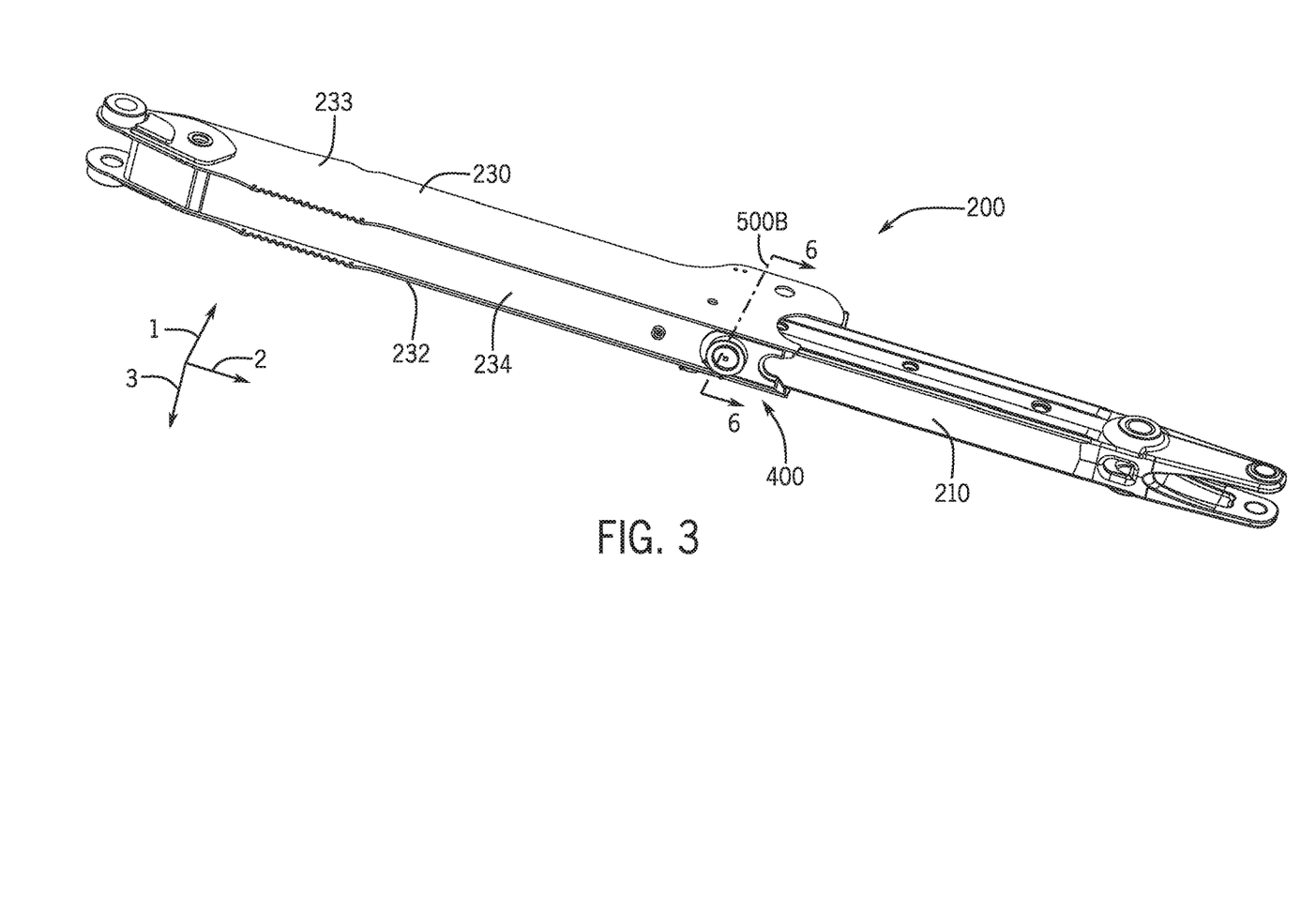
FIG. 3 is a bottom perspective view of the inner dipper and outer dipper of FIG. 2, including a bottom wear pad system.

FIG. 3 is a bottom perspective view of the inner dipper 210 and outer dipper 230 of FIG. 2, including a bottom wear pad system 400. As mentioned above, in some embodiments, there may be a gap between the inner dipper 210 and the outer dipper 230 to facilitate the translation of the outer dipper 230 along the inner dipper 210. More specifically, there may be a gap between a bottom side 234 of the outer dipper 230 and a corresponding side of the inner dipper 210.

Furthermore, the bottom wear pad system 400 may be adjusted to control the gap between the inner dipper 210 and the outer dipper 230 to, for example, reduce movement along the vertical direction 1 and/or to reduce noise that may result from the movement, while the outer dipper 230 translates along the longitudinal direction 2. The bottom wear pad system 400 is coupled to the bottom side 234 of the outer dipper 230 oriented along the direction opposite the vertical direction 1. Furthermore, the bottom wear pad system 400 may be coupled to the outer dipper 230 via any suitable method. For example, in an embodiment, the bottom wear pad system 400 may be welded to the bottom side 234 of the outer dipper 230. In other embodiments, the bottom wear pad system 400 may be bolted via openings on the bottom side 234.

Although the current embodiment of the backhoe tool 200 includes only one bottom wear pad system 400, in other embodiments, the backhoe tool 200 may include any suitable number of bottom wear pad systems 400 coupled on the bottom side 234 and/or a top side of the outer dipper 230. For example, the backhoe tool 200 may include 2, 4, 6, 10, or any suitable number of bottom wear pad systems 400. In some embodiments, the outer dipper 230 may include any suitable number of bottom wear pad systems 400 coupled to vertically opposite sides of the outer dipper 230. For example, the backhoe tool may include a first bottom wear pad system 400 coupled to the bottom side 234 of the outer dipper 230 and a top wear pad system coupled to the opposite side (e.g., the top side 235) of the outer dipper 230. Furthermore, in some embodiments, the backhoe tool 200 may include any suitable number of wear pad system on the top or bottom sides of the outer dipper 210.

Figure 4:
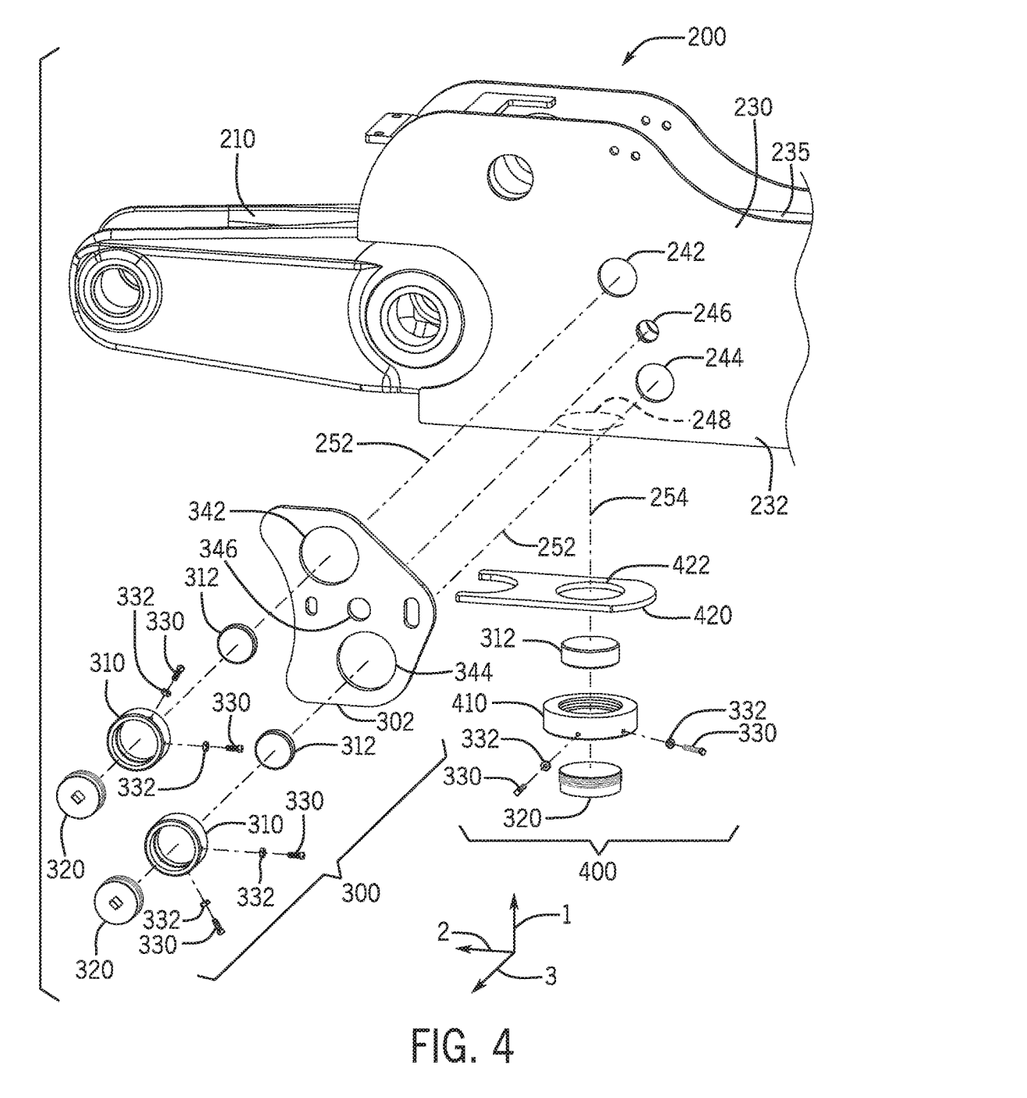
FIG. 4 is an exploded view of the side wear pad system of FIG. 2 and the bottom wear pad system of FIG. 3.

FIG. 4 is an exploded view of the side wear pad system of FIG. 2 and the bottom wear pad system of FIG. 3. The outer dipper 230 is configured to slide along the longitudinal direction 2 relative to the inner dipper 210. The side wear pad system 300 includes a side plate 302 that includes a first side plate opening 342, a second side plate opening 344, and a small pin opening 346. In one embodiment, the side plate 302 is coupled to the first lateral side 232 of the outer dipper 230 via a welded connection, such that the first side plate opening 342, the second side plate opening 344, and the small pin opening 346 are respectively aligned with a first outer dipper opening 242, a second outer dipper opening 244, and a third outer dipper opening 246 in the first lateral side 232. In other embodiments, the side plate 302 may be coupled to the first lateral side 232 via any other suitable connection (e.g., pins, fixtures, and riveting).

Furthermore, the first side plate opening 342 and the first outer dipper opening 242 may receive a wear pad 312 and may guide the wear pad 312 to contact the inner dipper 210. As such, after the wear pad 312 aligns with the first side plate opening 342 and the first outer dipper opening 242, the wear pad 312 may contact the outer side of the inner dipper 210. In a similar manner, the second side plate opening 344 and the second outer dipper opening 244 may receive a wear pad 312, such that when the wear pad 312 aligns with the second side plate opening 344 and the second outer dipper opening 244, the wear pad 312 may contact the outer surface the inner dipper 210. Furthermore, each wear pad 312 may be housed in a corresponding boss member 310, which may be fixed (e.g., via welding) to the side plate 302, such that the substantially circular opening of the boss member 310 aligns with the corresponding openings in the side plate 302 (e.g., the first side plate opening 342 and the second side plate opening 344). In some embodiments, the boss member 310 may be fixed (e.g., welded) to the outer dipper 230 (e.g., to the first lateral side 232) or fixed (e.g., welded) to both the side plate 302 and the outer dipper 230. Furthermore, in some embodiments, the boss member 310 may be directly fixed to the outer dipper 230. As such, in some embodiments, the side plate 302 may be omitted.

In some embodiments, the inner surface of the boss member(s) 310 is internally threaded to receive a corresponding adjustment cap 320. As illustrated, the adjustment cap(s) 320 include a circumferential surface that is externally threaded to engage the inner threads of the inner surface of the boss member 310. As such, each adjustment cap 320 may be rotated such that its external threads may interact with the internal threads of the boss member 310 to facilitate the movement of the adjustment cap 320 along the lateral axis 3. As such, the adjustment cap 320 may translate along the lateral axis 3 to contact the wear pad 312. In addition, the adjustment cap 320 may urge the wear pad 312 against the inner dipper by exerting a target pressure on the wear pad 312. As a result, in some embodiments, the wear pad 312 may exert the target pressure to the inner dipper 210 along an axis 252 and across a surface area formed by the wear pad 312.

In the illustrated embodiment, the wear pad 312 is positioned between the adjustment cap 320 and the inner dipper 210 along the axis 252 (e.g., which is parallel to the lateral axis 3). Furthermore, the wear pad 312 may be housed within the boss member 310, the side plate 302, the first lateral side 232 of the outer dipper 230, or any combination thereof. In the illustrated embodiment, includes two set screws 330 and two nuts 332. Each set screw 330 is configured to extend through a corresponding opening in the circumferential side of the boss member 310. In some embodiments, the openings in the boss member 310 include threads configured to engage corresponding threads of the set screws 330. Accordingly, rotation of the set screws 330 drives the set screws 330 to translate radially inward. The set screws 330 may translate into their corresponding openings in the boss member 310 to contact the adjustment cap 320 to block the rotation and translation of the adjustment cap 320, thereby fixing the adjustment cap 320 to the boss member 310 (e.g., by exerting a pressure on the adjustment cap 320). In other embodiments, the set screws 330 may be replaced with any suitable fastener that may contact the adjustment cap 320 to block the translation and the rotation of the adjustment cap 320.

Furthermore, the illustrated bottom wear pad system 400 is positioned on the bottom side 234 of the outer dipper 230. The bottom wear pad system 400 includes a bottom plate 420 that includes a bottom plate opening 422. The bottom plate opening 422 aligns with a fourth outer dipper opening 248, such that the fourth outer dipper opening 248 is positioned on the bottom side 234 of the outer dipper 230 and is oriented along axis 254. In one embodiment, the bottom plate 420 is welded to the bottom side 234 of the outer dipper 230. However, in other embodiments, the bottom plate 420 may be fixed to the bottom side 234 via any suitable method (e.g., riveting, pins, fixtures).

Furthermore, the bottom wear pad system 400 includes a bottom boss member 410 that has a substantially circular opening. The bottom boss member 410 includes an inner surface that is threaded and configured to engage with threads corresponding to the outer surface of the adjustment cap 320. The bottom boss member 410 may house the wear pad 312. As illustrated, the wear pad 312 may contact the inner dipper 210 via the fourth outer dipper opening 248 along the axis 254 and may contact the adjustment cap 320 along the axis 254 in the opposite direction. As mentioned above, the adjustment cap 320 may translate along the vertical direction 1 to contact the wear pad 312. Furthermore, the bottom boss member 410 may include two openings on the circumferential sides of the bottom boss member 410 configured to receive the two set screws 330 and nuts 332. Each set screw 330 is configured to extend through a corresponding opening in the circumferential side of the bottom boss member 410. In some embodiments, the openings in the circumferential side of the boss member 310 include threads configured to engage corresponding threads of the set screws 330. Accordingly, rotation of the set screws 330 drives the set screws 330 to translate radially inward.

The set screws 330 may translate into their corresponding openings in the bottom boss member 410 to contact the adjustment cap 320 to block the rotation and translation of the adjustment cap 320, thereby fixing the adjustment cap 320 to the boss member 310 (e.g., by exerting a pressure on the adjustment cap 320). In other embodiments, the set screws 330 may be replaced with any suitable fastener that may contact the adjustment cap 320 to block the translation and the rotation of the adjustment cap 320

The illustrated embodiment includes wear pads 312 that are substantially cylindrical in shape. As such, the openings in the plates 302, 420, sides 232, 233, 234,235, and the boss members 310,410 are substantially circular. However, in other embodiments, the cross-sections of the wear pads 312 and openings may have other suitable shape. For example, the cross-sections of the wear pads 312 and openings may be square, triangular, hexagonal, or any other suitable shape. Furthermore, in the illustrated embodiment, the wear pad systems 300, 400 each include two set screws 330 and two nuts 332 for each respective boss member 310, 410. However, in other embodiments, the wear pad systems 300, 400 may include 1, 2, 3, 4, 6, 8, or any suitable number of set screws and nuts for each boss member 310, 410.

Figure 5:
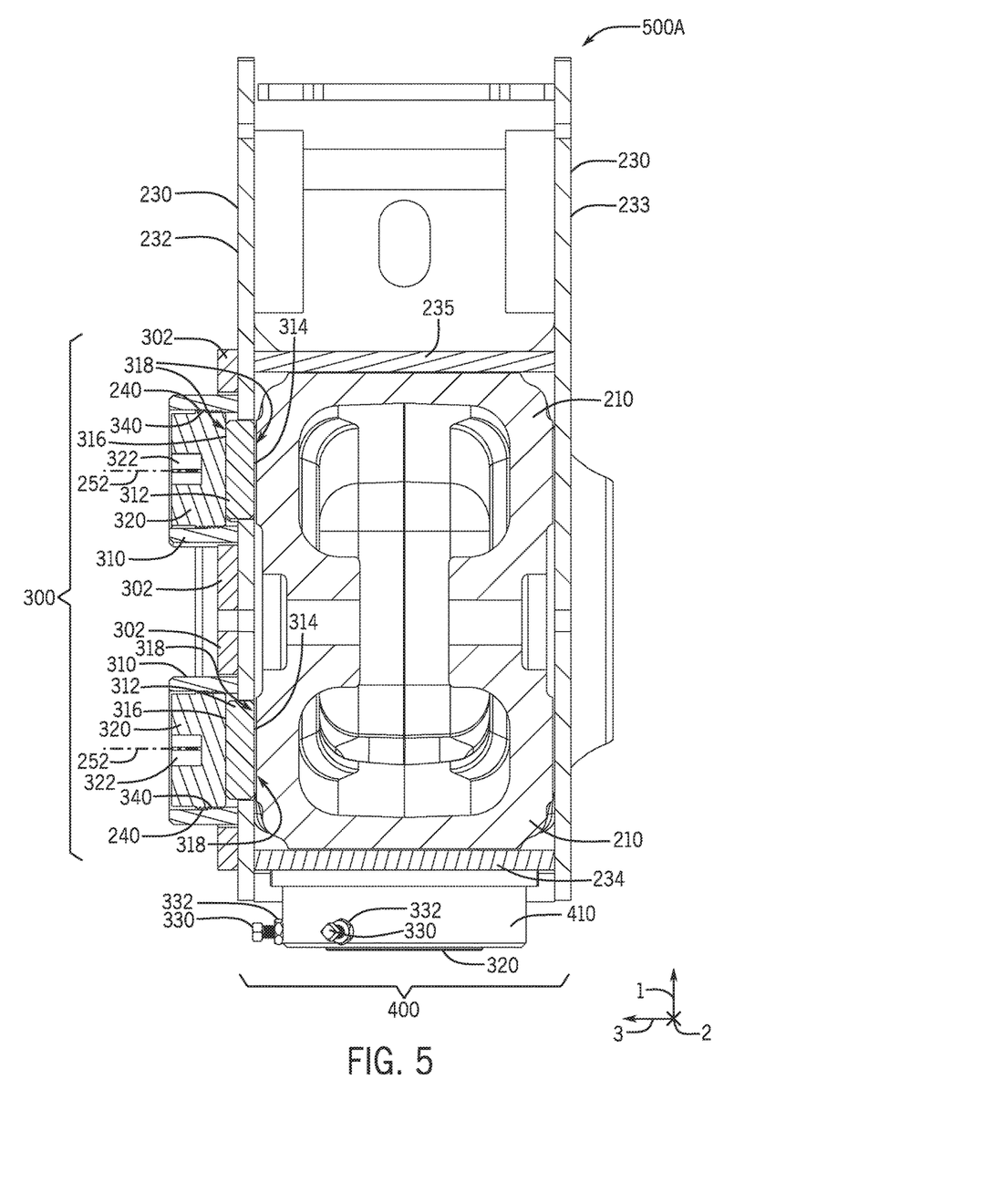
FIG. 5 is a cross-sectional view of the inner dipper and the outer dipper of FIG. 2, taken along line 5-5 of FIG. 2.

FIG. 5 is a cross-sectional view of the inner dipper 210 and the outer dipper 230 of FIG. 2, taken along line 5-5 of FIG. 2. To facilitate discussion of the side wear pad system 300, the cross-sectional view of the side wear pad system 300 is illustrated. As illustrated in FIG. 5, the outer dipper 230 is configured translate along the longitudinal direction 2 relative to the inner dipper 210. More specifically, the inner dipper 210 is enclosed at the top by the top side 235 of the outer dipper 230, enclosed at the bottom by the bottom side 234 of the outer dipper 230, enclosed at the first lateral side by the first lateral side 232 of the outer dipper 230, and enclosed at the second lateral side by the second lateral side 233 of the outer dipper 230. Although the inner dipper 210 and the outer dipper 230 include a quadrilateral cross-section, in other embodiments, the inner dipper 210 and outer dipper 230 may include any other suitable cross-section, such as a triangular cross-section, circular cross-section, hexagonal cross-section, and the like.

As mentioned above, there may be a gap between the inner surface of the outer dipper 230 and the outer surface of the inner dipper 210, such that lateral and/or vertical movement may result. To reduce the gaps along the lateral direction 3, the illustrated embodiment includes two wear pads 312, which respectively contact the inner dipper 210 via a first surface 314 of the wear pad 312 and contact an adjustment cap 320 at a second surface 316 of the wear pad 312. A lubricant 318 may be applied to the first surface 314 and the second surface 316 of the wear pads, for example, to reduce friction, reduce gaps, and facilitate the movement (e.g., rotation and translation) of the wear pad 312.

In the illustrated embodiment, the side wear pad system 300 includes an enclosure for each wear pad 312. Each enclosure is formed along the lateral direction 3 by the adjustment cap 320 at one lateral end and the inner dipper 210 at another lateral end. Furthermore, the enclosure is formed circumferentially around the wear pad 312 by the outer dipper 230 (e.g., the first lateral side 232), the side plate 302, and the boss member 310. In the illustrated embodiment, the enclosure is fixed along the vertical axis 1, while the enclosure is adjustable along the lateral axis 3 via rotation of the adjustable cap 320.

The adjustment caps 320 each include respective outer threads 340 (e.g., on the outer surface) that may engage with inner threads 240 (e.g., on the inner surface) of the boss member 310. The adjustment caps 320 may rotate about the axis 252 (e.g., the axis substantially perpendicular to the first lateral side 232 of the outer dipper 230), and the threaded interface may drive the adjustment cap 320 to translate along the lateral direction 3. The adjustment cap 320 is configured to urge the wear pad 312 along the lateral direction 3 toward the inner dipper 210 in response to rotation of the adjustment cap 320 to reduce gap(s) and/or play between inner dipper 210 and the outer dipper 230.

Furthermore, the adjustment caps 320 each include an opening 322 to receive a protrusion of a tool to facilitate the rotation of the adjustment cap 320, thereby driving the corresponding wear pad 312 toward the inner dipper 210. For example, the opening 322 may be polygonal and configured to receive a polygonal protrusion of a tool (e.g., wrench). In some embodiments, the adjustment caps 320 may be torqued to a suitable pressure (e.g., via a torque wrench), for example, that may reduce the gap between the inner dipper 210 and the outer dipper 230 and also reduce movement along the lateral direction 3. As such, the pressure of the wear pads 312 on the side wear pad system 300 may be independently controlled (e.g., via a torquing device engaging with the openings 322) to cause the wear pads 312 to exert a suitable pressure on the inner dipper 210. In some embodiments, the wear pad 312 may apply pressure to the inner dipper 210, such that the inner dipper 210 may be urged against the second lateral side 233 of the outer dipper 230. In some embodiments, the opening 322 does not extend through the length of the adjustment cap 320. However, in other embodiments, the opening 322 may extend through the length of the adjustment cap 320, such that the opening extends from one end of the adjustment cap 320 to the opposite end of the adjustment cap 320.

Figure 6:
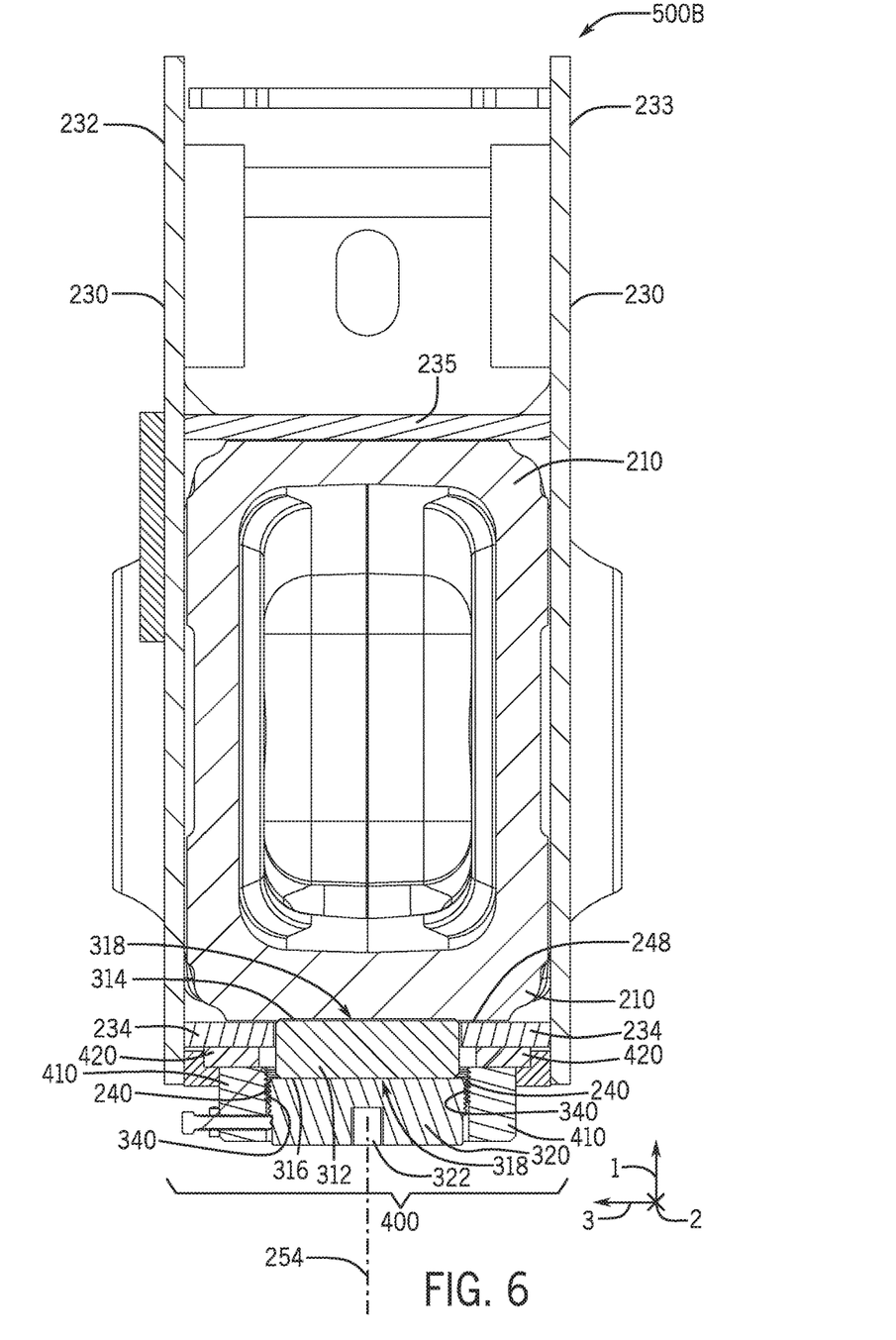
FIG. 6 is a cross-sectional view of the inner dipper and the outer dipper of FIG. 2, taken along line 6-6 of FIG. 3.

FIG. 6 is a cross-sectional view of the inner dipper 210 and the outer dipper 230 of FIG. 2, taken along line 6-6 of FIG. 3. In the illustrated embodiment, the wear pad system includes the wear pad 312 in the enclosure formed along the vertical direction 1 by the inner dipper 210 at one vertical end, and the adjustment cap 320 at the opposite vertical end, and formed along the circumferential direction by the bottom boss member 410, the bottom plate 420, and the bottom side 234 of the outer dipper 230.

After the adjustment cap 320 has been torqued to establish a target pressure, the set screws 330 and the corresponding nuts 332 may block rotation of the adjustment cap 320. For example, the set screws 330 may pass through openings in the bottom boss member 410 to contact the adjustment cap 320. As such, the pressure the set screws 330 exert on the adjustment cap may block rotation of the adjustment cap 320 relative to the bottom boss member 410.

Figure 7:
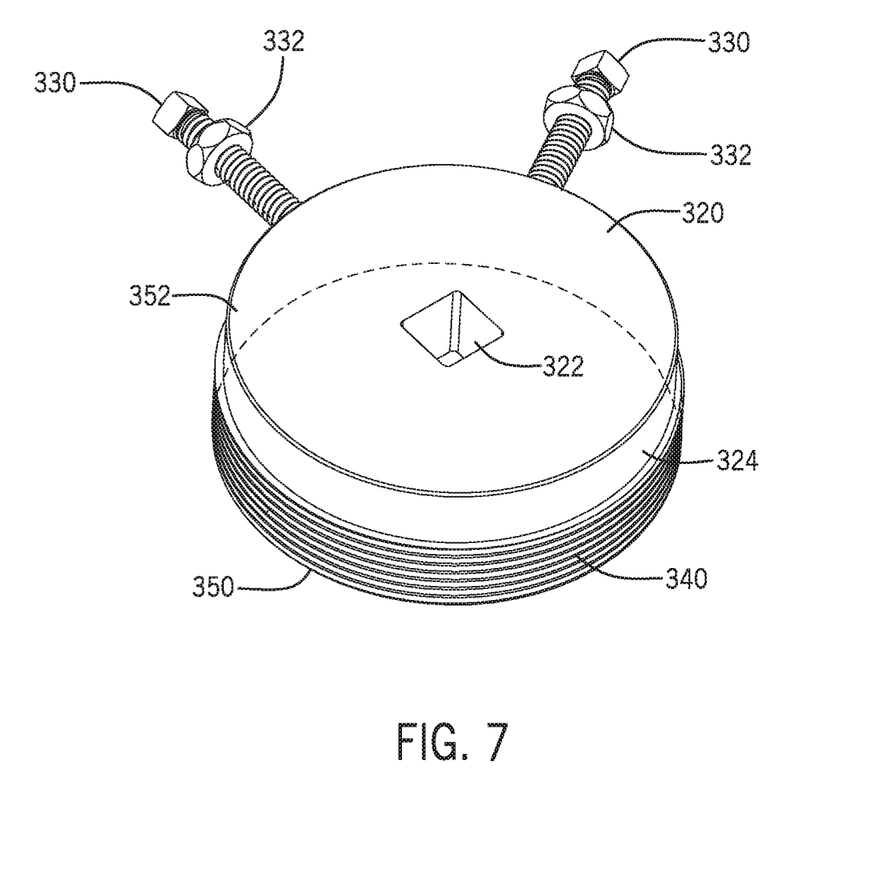
FIG. 7 is a perspective view of an adjustment cap that may be used within the side wear pad system of FIG. 2 and the bottom wear pad system of FIG. 3.

FIG. 7 is a perspective view of the adjustment cap 320 that may be used in the side wear pad system of FIG. 2 and the bottom wear pad system 400 of FIG. 3. In the illustrated embodiment, the wear pad system includes the adjustment cap 320 that is cylindrical and has the outer threads 340 that may engage with the inner threads of the boss members. The opening 322 is configured to receive a protrusion of a tool and is positioned on the second surface 352 of the adjustment cap 320. In some embodiments, the opening 322 does not extend through the length of the adjustment cap 320. However, in other embodiments, the opening 322 may extend through the length of the adjustment cap 320, such that the opening extends from one end of the adjustment cap 320 to the opposite end of the adjustment cap 320. Furthermore, the first surface 350 is circular and includes chamfered edges 324.

The adjustment cap 320 further includes a first surface 350 that is also circular and does not include the opening 322. As such, in the illustrated embodiment, the first surface 350 of the adjustment cap 320 is solid. After the adjustment cap 320 has been torqued to establish a target pressure, the set screws 330 and the corresponding nuts 332 may be engaged to block rotation of the adjustment cap 320. For example, the set screws 330 may pass through openings in the bottom boss member 410 to contact the adjustment cap 320. As such, the pressure applied by the set screws 330 on the adjustment cap may block the rotation of the adjustment cap 320 relative to the bottom boss member 410. Furthermore, the nuts 332 may be threaded and may engage the threads on the set screws 330 to maintain the set screws 330 in the target position relative to the boss members, thereby blocking rotation of the adjustment cap 320 relative to the boss member and maintaining the pressure applied by the wear pad 312.

While only certain features have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A wear pad system, comprising:
a wear pad having a contact surface configured to contact a corresponding contact surface of an inner dipper of a backhoe tool;
an adjustment cap having a threaded outer surface; and
a boss member configured to be positioned on an outer dipper of the backhoe tool and to guide the wear pad along a path toward the corresponding contact surface of the inner dipper, wherein the boss member has a threaded inner surface, and the outer dipper comprises an opening that receives the wear pad and guides the wear pad to contact the corresponding contact surface of the inner dipper;
wherein the outer dipper is configured to move relative to the inner dipper, the threaded outer surface of the adjustment cap is configured to engage the threaded inner surface of the boss member, the adjustment cap is configured to urge the contact surface of the wear pad into contact with the corresponding contact surface of the inner dipper in response to rotation of the adjustment cap relative to the boss member, the wear pad is rotatable relative to the adjustment cap at least while the threaded outer surface of the adjustment cap is engaged with the threaded inner surface of the boss member, and the inner dipper and the adjustment cap both press on the wear pad.

2. The wear pad system of claim 1, wherein the outer dipper is moveably coupled to the inner dipper.

3. The wear pad system of claim 1, wherein the wear pad is substantially cylindrical in shape, and wherein the contact surface of the wear pad has a substantially circular shape.

4. The wear pad system of claim 1, wherein the boss member rigidly coupled to the outer dipper.

5. The wear pad system of claim 1, wherein a cross-sectional shape of the adjustment cap is substantially similar to a cross-sectional shape of the wear pad.

6. The wear pad system of claim 1, comprising a layer of lubricant applied to the contact surface of the wear pad.

7. The wear pad system of claim 1, comprising one or more set screws configured to engage with corresponding openings on the boss member to block the rotation of the adjustment cap.

8. The wear pad system of claim 1, wherein the boss member enables the wear pad to rotate, to translate within a plane perpendicular to the path, or any combination thereof, within the boss member.

9. The wear pad system of claim 1, wherein the adjustment cap has an opening configured to receive a protrusion of a tool to facilitate driving the adjustment cap in rotation.

10. A wear pad system for a backhoe tool, comprising:
a wear pad having a contact surface configured to contact a corresponding contact surface of an inner dipper;
an adjustment cap having a threaded outer surface;
a boss member configured to be positioned on an outer dipper and to guide the wear pad along a path toward the corresponding contact surface of the inner dipper, wherein the boss member has a threaded inner surface; and
wherein the outer dipper is configured to move relative to the inner dipper, the threaded outer surface of the adjustment cap is configured to engage the threaded inner surface of the boss member, the adjustment cap is configured to urge the contact surface of the wear pad into contact with the corresponding contact surface of the inner dipper in response to rotation of the adjustment cap relative to the boss member, the outer dipper comprises an opening configured to receive the wear pad and to guide the wear pad along the path toward the corresponding contact surface of the inner dipper, and the opening in the outer dipper is smaller than a surface of the adjustment cap configured to contact the wear pad.

11. The wear pad system of claim 10, wherein the wear pad is substantially cylindrical in shape, and wherein the contact surface of the wear pad has a substantially circular shape.

12. The wear pad system of claim 10, comprising a set screw configured to extend through a corresponding opening in the boss member to engage a substantially smooth surface of the adjustment cap, the set screw is configured to block rotation of the adjustment cap via contact with the substantially smooth surface, and the substantially smooth surface of the adjustment cap enables the set screw to contact any circumferential position around the adjustment cap to block the rotation of the adjustment cap.

13. The wear pad system of claim 10, comprising a first layer of lubricant applied to the contact surface of the wear pad, a second layer of lubricant applied to the corresponding contact surface of the inner dipper, and a third layer of lubricant applied to the threaded inner surface of the boss member.

14. The wear pad system of claim 10, wherein the adjustment cap has an opening configured to receive a protrusion of a tool to facilitate driving the adjustment cap in rotation.

15. The wear pad system of claim 10, wherein the boss member enables the wear pad to rotate, to translate within a plane perpendicular to the path, or any combination thereof, within the boss member.

16. A wear pad system for a backhoe tool, comprising:
a first wear pad having a first contact surface configured to contact a first lateral side of an inner dipper, and a second wear pad having a second contact surface configured to contact a top or bottom side of the inner dipper;
a first adjustment cap corresponding to the first wear pad and a second adjustment cap corresponding to the second wear pad, wherein the first and second adjustment caps each have a respective threaded outer surface;

a first boss member corresponding to the first wear pad configured to be positioned on a first lateral side of an outer dipper and to guide the first wear pad along a first path toward the first lateral side of the inner dipper; and a second boss member corresponding to the second wear pad configured to be positioned on a top or bottom side of an outer dipper to guide the second wear pad along a second path toward the top or bottom side of the inner dipper;

wherein the first boss member and the second boss member each have a threaded inner surface, the outer dipper is configured to move relative to the inner dipper, the respective threaded outer surfaces of the first and second adjustment caps are configured to engage the threaded inner surfaces of the corresponding boss members, the first adjustment cap is configured to urge the contact surface of the first wear pad into contact with the first lateral side of the inner dipper in response to rotation of the first adjustment cap relative to the first boss member, the second adjustment cap is configured to urge the contact surface of the second wear pad into contact with the top or bottom side of the inner dipper in response to rotation of the second adjustment cap relative to the second boss member, the first wear pad and the second wear pad are rotatable relative to the first adjustment cap and the second adjustment cap, respectively, the first wear pad and second wear pad are rotatable relative to the first adjustment cap and the second adjustment cap, respectively, at least while the threaded outer surface of each of the first adjustment cap and second adjustment cap are engaged with the threaded inner surface of the first and second boss members, respectively, the inner dipper and the first adjustment cap both press on the first wear pad, and the inner dipper and the second adjustment cap both press on the second wear pad.

17. The wear pad system of claim 11, comprising a third wear pad having a third contact surface configured to contact a second lateral side of the inner dipper, wherein the second lateral side and the first lateral side are substantially parallel.

18. The wear pad system of claim 11, wherein the first and second adjustment caps each have an opening that extends through a portion of a length of the respective adjustment cap, and each opening of the first and second adjustment caps is configured to receive a protrusion of a tool to facilitate driving the respective adjustment cap in rotation.

19. The wear pad system of claim 11, wherein the first path is a lateral path and the second path is a vertical path oriented substantially perpendicular to the lateral path.

* * * * *